US012217735B2

(12) United States Patent
Forbes et al.

(10) Patent No.: US 12,217,735 B2
(45) Date of Patent: Feb. 4, 2025

(54) AUDIO OUTPUT MODULE FOR USE IN ARTIFICIAL VOICE SYSTEMS

(71) Applicant: FORBES REHAB SERVICES, INC., Mansfield, OH (US)

(72) Inventors: Paul W. Forbes, Lexington, OH (US); Clayton Prescan Smeltz, Mansfield, OH (US)

(73) Assignee: FORBES REHAB SERVICES, INC., Mansfield, OH (US)

(*) Notice: Subject to any disclaimer, the term of this patent is extended or adjusted under 35 U.S.C. 154(b) by 0 days.

(21) Appl. No.: 17/409,804

(22) Filed: Aug. 24, 2021

(65) Prior Publication Data

US 2021/0383791 A1 Dec. 9, 2021

Related U.S. Application Data

(63) Continuation of application No. 16/090,816, filed as application No. PCT/US2011/001959 on Dec. 5, 2011, now Pat. No. 11,100,915.

(Continued)

(51) Int. Cl.
*G10L 13/047* (2013.01)
*G10L 13/00* (2006.01)

(Continued)

(52) U.S. Cl.
CPC ............ *G10L 13/047* (2013.01); *G10L 13/00* (2013.01); *H04R 1/025* (2013.01); *H04R 1/04* (2013.01); *G10L 2021/0575* (2013.01)

(58) Field of Classification Search
CPC ....... G10L 13/047; G10L 13/00; G10L 21/02; G10L 2021/0575; G10L 2021/065;
(Continued)

(56) References Cited

U.S. PATENT DOCUMENTS 4,274,162 A 6/1981 Joy
6,346,088 B1 * 2/2002 Stone .................... A61H 37/00 601/99

(Continued)

OTHER PUBLICATIONS

International Search Report and Written Opinion in related International Application No. PCT/US2011/001959 dated Mar. 29, 2012; 12 pages.

*Primary Examiner* — Yogeshkumar Patel
(74) *Attorney, Agent, or Firm* — McDonald Hopkins LLC

(57) ABSTRACT

The invention disclosed is an improved audio output module for use with an artificial voice generation device, having a housing separated into a sound system chamber, an interface chamber, and a power source chamber. The interface and power source chambers may be combined. The sound chamber is isolated from external air by the housing, the cover plate, and a separating wall, which separates it from other chambers of the module. Volumetric parameters based on speaker characteristics and design requirements can thus be implemented independent from the choice of interface type. The module is configurable to be mounted to an external structure or to a speech generating system. It may likewise be detachable from a quick release cradle and receive wireless audio signals from the speech generating system.

20 Claims, 13 Drawing Sheets

Related U.S. Application Data

(60) Provisional application No. 61/419,325, filed on Dec. 3, 2010.

(51) Int. Cl.

| | |
|---|---|
| ***G10L 21/057*** | (2013.01) |
| ***H04R 1/02*** | (2006.01) |
| ***H04R 1/04*** | (2006.01) |

(58) Field of Classification Search

CPC .......... H04R 1/025; H04R 1/04; H04R 25/50; H04R 25/505

See application file for complete search history.

(56) References Cited

U.S. PATENT DOCUMENTS

| | | | | |
|---|---|---|---|---|
| 7,318,496 | B2 | 1/2008 | Sahyoun | |
| 7,340,221 | B2 | 3/2008 | Wikel | |
| 7,676,372 | B1 * | 3/2010 | Oba | G09B 21/009 704/271 |
| 2002/0148678 | A1 * | 10/2002 | Sahyoun | H04R 7/20 181/171 |
| 2006/0057973 | A1 * | 3/2006 | Wikel | H04M 1/6066 455/90.3 |
| 2007/0007661 | A1 * | 1/2007 | Burgess | H01L 23/49855 257/E23.064 |
| 2009/0226017 | A1 * | 9/2009 | Abolfathi | B33Y 80/00 381/326 |

* cited by examiner

FIG. 18
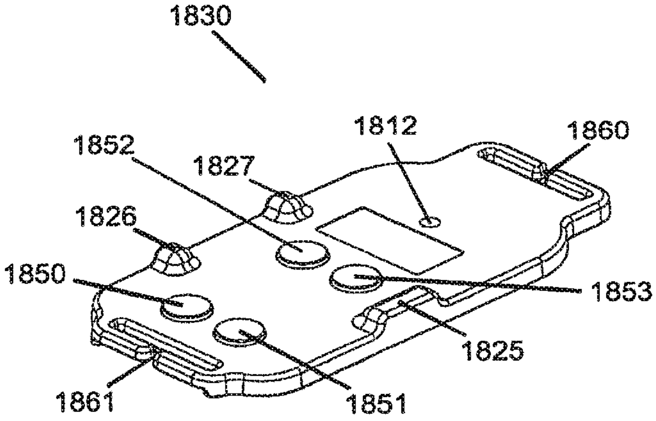
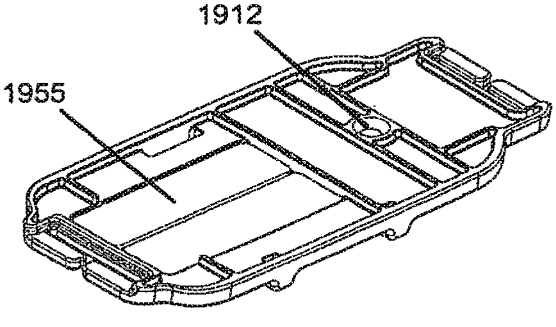
FIG. 19

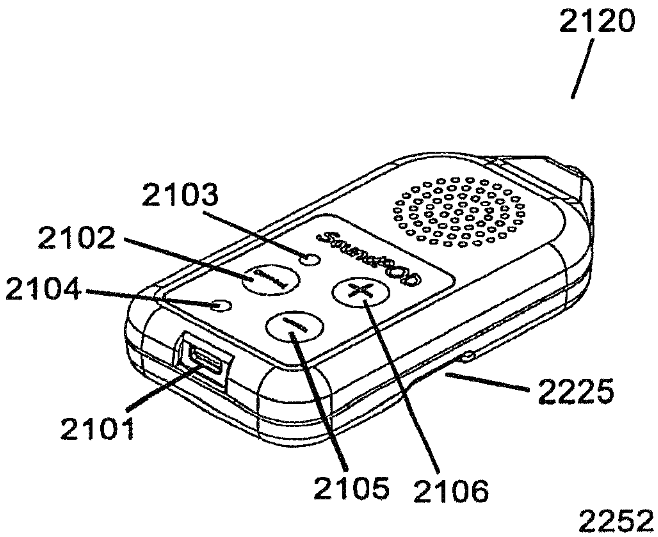
FIG. 21
FIG. 22
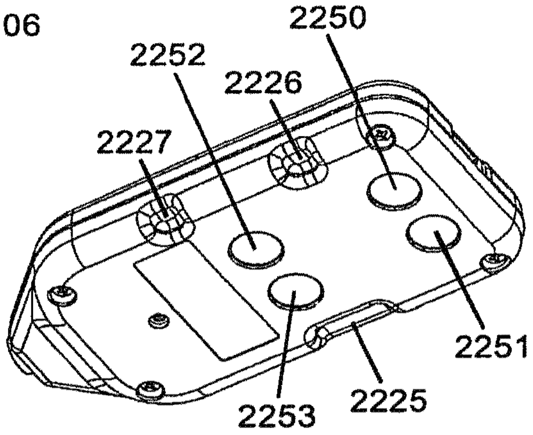
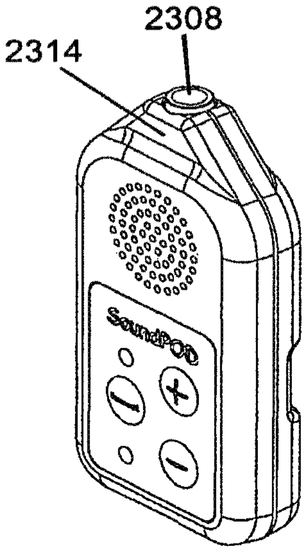
FIG. 23
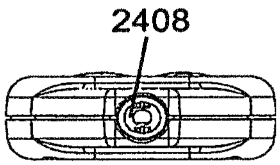
FIG. 24

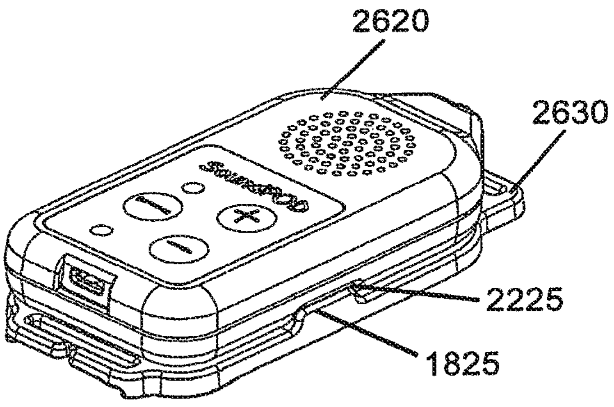
FIG. 26
FIG. 27
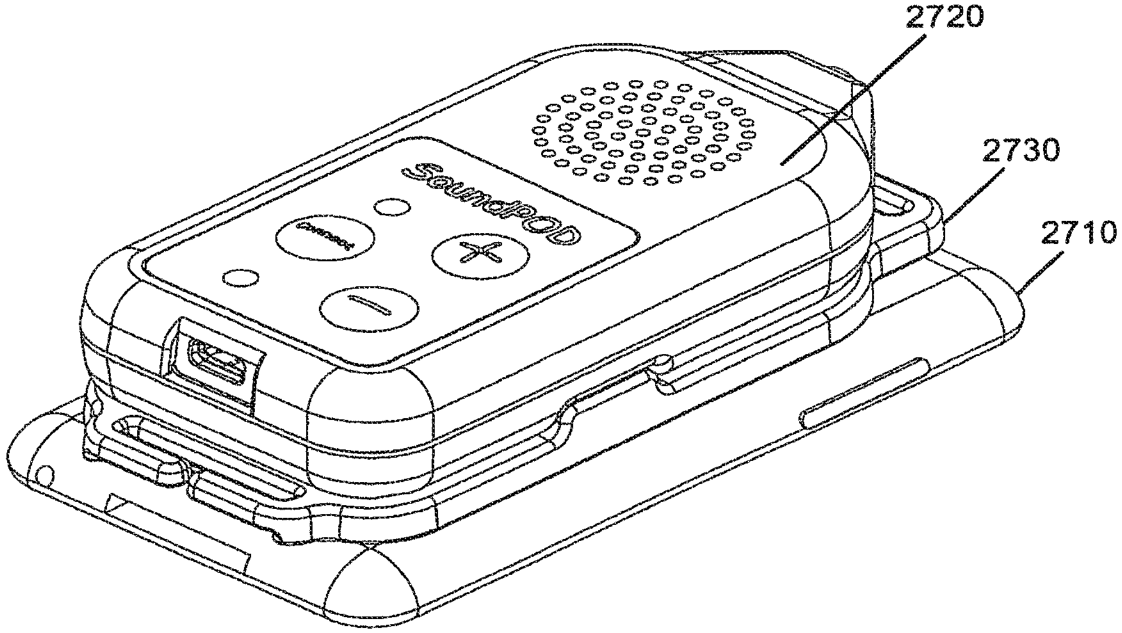

AUDIO OUTPUT MODULE FOR USE IN ARTIFICIAL VOICE SYSTEMS

CROSS-REFERENCE TO RELATED APPLICATIONS

This application is a continuation of U.S. patent application Ser. No. 16/090,816, filed Apr. 17, 2019, entitled AUDIO OUTPUT MODULE FOR USE IN ARTIFICIAL VOICE SYSTEMS, which is the U.S. National Phase entry of International Patent Application No. PCT/US2011/001959, filed Dec. 5, 2011, entitled AUDIO OUTPUT MODULE FOR USE IN ARTIFICIAL VOICE SYSTEMS, which claims priority to U.S. Provisional Patent Application No. 61/419,325, filed Dec. 3, 2010, all of the above listed applications are herein incorporated by reference.

STATEMENT REGARDING FEDERALLY SPONSORED RESEARCH

None.

BACKGROUND OF THE INVENTION

The present invention generally relates to audio output technology, and more specifically to improved audio output devices configured for use in artificial voice applications.

People have grappled with disabilities throughout recorded history. According to the World Health Organization, "[d]isabilities is an umbrella term, covering impairments, activity limitations, and participation restrictions." There is often interaction between these elements, with physical impairments or handicaps often being the root of many limitations or restrictions on a person's ability to participate in certain activities, or their ability to complete certain tasks. Much technological advancement has occurred with the aim of directly benefiting persons with disabilities by lessening the impact such impairments may have on their ability to carry out common tasks. For example, common handicaps like vision impairment have long been correctable with eyeglasses, and more recently, with contact lenses and laser vision correction surgery.

Other impairments can be more physically debilitating, such as complete paralysis or akinesia caused by a neurological disorder. These and other acute impairments can drastically limit a person's ability to participate in wide range of activities. In some cases, impairments can even affect a person's ability to communicate effectively with others.

While communication disorders cover a myriad of specific diagnoses, certain of them can limit a person's communicative abilities by severely impairing or completely disabling their ability to speak. Such impairments may result from dysarthria, apraxia of speech, certain voice disorders, akinetic mutism, or other such conditions. Limitations on speech can have a significant impact on a person's life, especially where the root of the impairment can create problems beyond speech limitations, such as dysarthria. Dysarthrias caused by degenerative neurological diseases can significantly impair a person's fine motor control to such a degree that many common tasks, such as eating and speaking, cannot be accomplished without assistance. When faced with such significant impairments, communication can become simultaneously more arduous to accomplish and more critical for quality of life purposes.

In many cases, a person's inability to communicate is due to a physical impairment. All of their cognitive faculties are available, but it is difficult for that person to express all of their ideas, needs and feelings to others. The current state of the art provides for a range of communication devices that a disabled person can interface with that facilitate communication. In cases of complete or nearly complete paralysis, for example, the only parts of the body that can be moved are the eyes. Currently, eye movement and focusing sensors allow persons with this type of impairment to use their eyes to operate computer software that is configurable to help them communicate and operate other devices.

In other cases, voice disorders caused by physical problems of the throat and neck area may affect a person's ability to speak, but do not otherwise affect motor control. The inability to speak brought about by these types of disorders can be supplemented with portable artificial voice generating software and hardware that translates typed messages into sound, or that play preset messages at the direction of the user.

Regardless of the type or level of impairment that a person may experience, artificial voice generation is a vital tool for those persons coping with speech impairments. To implement such a system, current art teaches the use of software and applicable components integrated with commercially available, portable computers. For example, a system for reading eye movement to generate speech might be implemented using eye movement sensors connected with a tablet computer, which is in turn attached to a wheelchair mount. A software application designed to receive input from the eye movement sensors is then installed and executed on the tablet computer. The user then navigates a series of menus to direct the software to generate artificial speech, which is projected via the tablet computer's integrated sound system. Similarly, software that receives input via a touch screen or keyboard—instead of eye movement sensors—can be used to direct speech generation for users that do not have significantly impaired motor control.

While the current state of the art decreases the limitations and restrictions on activity for many persons with speech disabilities, many problems still exist. One limitation on the effectiveness of current artificial voice generating systems is sound quality and volume. Tablet computers, mobile handheld systems, and other small computing devices are used as the primary platform on which artificial voice generating software and its applicable related sensing components are implemented. By using commercially available computing platforms, the cost of artificial voice generating systems are greatly reduced, making them affordable and accessible to a far greater number of disabled persons than there would be otherwise. Additionally, because artificial voice generating systems are used on a near-constant basis, user needs require that they be compact and portable. This requirement largely constrains the designs of these systems to utilize the functionality contained within the computing platforms—i.e., the integrated sound systems.

Thus, current artificial voice generating systems utilize the integrated sound functionality built into commercially available computing hardware. These devices, while robust and compact, are designed largely with personal use as the primary use environment. The normal output level of these integrated sound systems are designed to meet the needs of an operator using the device in personal settings, such as in an office, at home, or while traveling. That is, when such an operator utilizes the onboard speakers, they are often in a relatively quiet setting and are in close proximity to the speakers themselves. When an audio generating device is used in a setting with more ambient noise, headphones are often used to provide low output sound directly to the listener's ear. These systems are not designed to communicate speech to others in everyday settings.

For audio output used in the context of an artificial voice generating system, however, the design requirements are more demanding than those taken into consideration in the design of tablet or laptop computers. Current systems suffer from a lack of high-level sound output. Therefore, it can be quite difficult for listeners to whom the generated speech is directed, to hear and respond to the communication. This is true even when the device is used in a setting with moderate levels of ambient noise. In a crowded room, or at a meeting, for instance, it can be difficult for current systems to produce enough sound volume to be heard over other voices or over ambient noise. This inability to effectively convey the artificial speech to others greatly reduces the effectiveness of the system. Therefore, there is a need in the current art for an artificial voice generating system that has the ability to produce high-decibel sound output without sacrificing mobility and compactness.

A related problem associated with the output level is the tonal quality of the sound produced. Simply increasing the power output to existing integrated sound systems will distort the voice generated by the system, making it difficult for others to decipher. Also, many integrated systems are not designed for higher levels of output, therefore making such an attempt to increase power in existing systems impractical as doing so may damage or destroy the components of the system. Therefore, the problematic sound output levels inherent in the current art require a confluence of solutions that increase sound output levels while maintaining compactness, portability, and commercial value, while simultaneously maintaining or improving the tonal qualities of the output.

Another problem with the state of the art involves the physical location of the sound output device. As current systems utilize the sound system integrated with the computing platform, the sound naturally emanates from the device itself.

These devices are most often secured to a wheel chair mount in front of or to the side of the seat, or are carried by the system's user. Those interacting with the user of an artificial voice generating system, however, initially expect the user's voice to emanate from the general area of the user's head. Upon first contact, the user of an artificial voice generating system often must repeat their initial speech because the person to whom they are speaking is caught off guard. Therefore, giving users the option to have the artificially generated voice emanate from a physical location that is more akin to natural speech is an unmet need in the field.

The ability of an audio output module to be separable from a speech generating device creates other useful consequences. The present invention seeks to increase not only output volume and tonal quality in the audio modules, but also the level of portability provided by the system. This can inject a level of discreteness in communication utilizing an artificial voice generation system. For example, in some settings, the artificial voice generating system user may not wish to communicate with everyone in the room, wishing to remain discrete. The user may be out to dinner with their spouse, in a more intimate setting. The user might be a student with special needs that must communicate with the teacher or an aide about circumstances that may be embarrassing to communicate to the entire class.

In other settings, portability could also increase safety and assist a user's loved ones. Parents of a disabled child may wish to complete tasks around the house, but have a difficult time leaving the communication range of their child's artificial voice generation system, fearing that they will need assistance. Portability in an audio output module would be extremely useful in these circumstances as the parent could carry the audio output module with them, enabling communication between the child and the parent.

Thus there are presently unmet and growing needs for improvements to existing artificial voice generating systems that will enable more effective communication by and with persons who are speech impaired.

BRIEF SUMMARY OF THE INVENTION

The invention is embodied in an improved detachable audio output module used for projecting artificial voice sounds generated from a speech generating system. In a preferred embodiment, the module is composed of a machined housing having at least two chambers, a sound chamber and an interface chamber, and a cover plate. A power chamber and miscellaneous chambers for extraneous features may be included separately as well, or can be incorporated into the interface chamber. When the cover plate is attached to the housing and sealed, the sound chamber is cordoned off from outside air. Electrical connections between the sound, interface, and power components are made by wires passed through voids in the chamber walls. The voids are sized slightly larger than the wire, around which an insulating hollow tube of material is placed, and the insulated portion of the wire is fitted into the void, sealing the chambers apart. The sound chamber volume can thus be designed to properly damp the speaker system, while simultaneously driving it with high voltage sound signals. The audio output module can thus be designed as a low profile module, or to be worn as a pendant if the interface module is wireless.

The wearable audio output module may comprise a sound output housing with an interface chamber containing an interface module housed in the interface chamber, an acoustically isolated sound chamber containing a sound output speaker in communication with the interface module and with a sound generation port, said interface module within the sound output housing being in wireless communication with a speech generating system, an externally accessible control interface with controls for activating and controlling the sound output device, a pendant attachment point allowing the sound output device to be secured about the body of a user by a pendant attachment, with said pendant attachment securing the sound generation port in a position within about 30 degrees from the center point of the mount of the body of the user from the perspective of a listener, wherein the sound output device generates artificial voice of an improved quality upon activation of the sound output module, whereupon artificial voice output is generated by the speech generating system communication to the audio output module and delivering sound generating signals to the sound output speaker, while said sound output device is secured about the body of the user through the pendant attachment and the audio output is perceived to emanate from the mouth of the body of the user. The audio output module can also include a quick release cradle attachable to the body of a user or to a speech generating system, allowing the sound output device to be removably attached to the quick release cradle.

The invention is further embodied in a sound output device enclosure for in an artificial voice generating system, comprising a sound output housing further comprising an interface chamber having an external antenna connection for allowing an external connection from an independent transmitter to an electronic interface module housed in the interface chamber, a sound chamber, wherein the interface chamber and the sound chamber share a separating wall, an internal port through the separating wall through which a connecting wire may pass, a cover plate secured to the housing such that the cover plate forms an airtight seal and separating the interface chamber and the sound chamber, an external sound output housing surface mateable with a quick release cradle, and the interior of the housing and the cover plate being coated with a first layer conductive copper flake electromagnetic interference and a second layer nonconductive conformal clear coating. The sound output device enclosure further comprises an audio output module fitting within the interface chamber of the sound output housing in communication with an speech generating system, a sound output speaker fitting within the sound chamber of the sound output housing in communication with the audio output module and with a sound generation port, an externally accessible control interface with controls for activating and controlling the sound output device, and a pendant attachment point allowing the sound output device to be secured about the body of a user, wherein the sound output device generates artificial voice of an improved quality upon activation of the sound output module, whereupon artificial voice output is generated by the speech generating system communicating to the audio output module and delivering sound generating signals to the sound output speaker, while said sound output device is either secured about the body of the user through the pendant attachment point or by mating the sound output housing to the sound module cradle.

BRIEF DESCRIPTION OF THE DRAWINGS

For a fuller understanding of the nature and advantages of the present invention, reference should be had to the following detailed description taken in connection with the accompanying drawings, in which:

FIG. 18 is a perspective view of a notched quick release cradle;

FIG. 19 is a bottom view of the embodiment of a quick release cradle depicted in FIG. 18;

FIG. 21 shows a perspective view of a wireless audio output module that is configured to be worn around a user's neck;

FIG. 22 shows a perspective view of the bottom of the embodiment shown in the FIG. 21;

FIG. 23 shows an elevated perspective view of the embodiment depicted in FIG. 21;

FIG. 24 is a top view of the wireless embodiment depicted in FIG. 21;

FIG. 26 is a perspective view of the wireless embodiment depicted in FIG. 21 attached to a quick release cradle; and FIG. 27 is a perspective view of an assembly of the embodiments shown in FIGS. 18 and 21 in use with a speech generating system.

DETAILED DESCRIPTION OF THE INVENTION

Disclosed herein is an improved audio output module for use in an artificial voice generation system.

Figure 1:
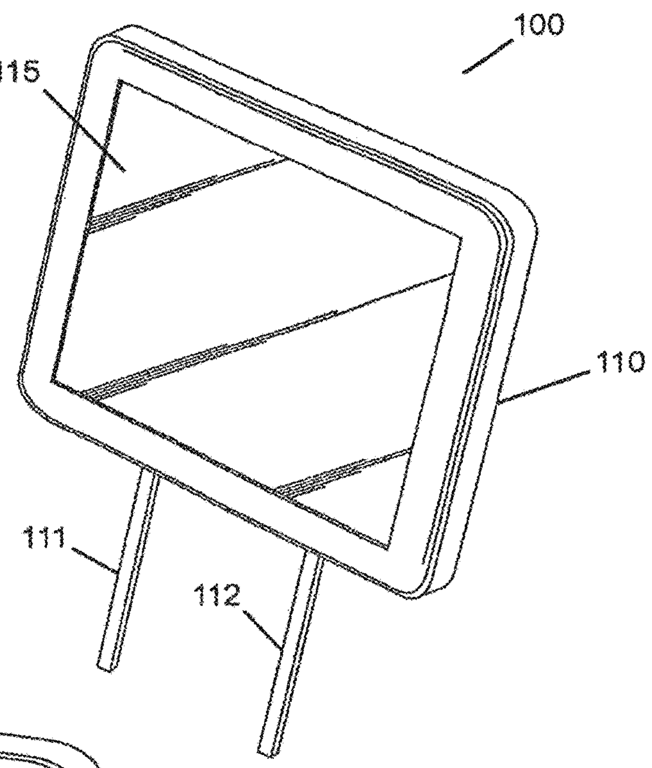
FIG. 1 shows a perspective view of the front of an artificial voice generating system mounted onto an external support.

A common implementation of an artificial voice generating system is one using a portable tablet computer device to run speech generation software. FIG. 1 depicts an artificial voice generating system 100 mounted on a left support 111 and a right support 112. The left support 111 and right support 112 can be a support system that allows the system 100 to be mounted onto a wheelchair, bed frame, or any other place where it would be convenient for the user. The system 100 includes a speech generating system 110, which is often a commercially available tablet computer, and displays the speech generation software's graphical user interface on the screen 115. The screen 115 can be a touch screen, thereby receiving instructions from a person's touch. However, many input methods are envisioned, based on a particular person's need.

Figure 2:
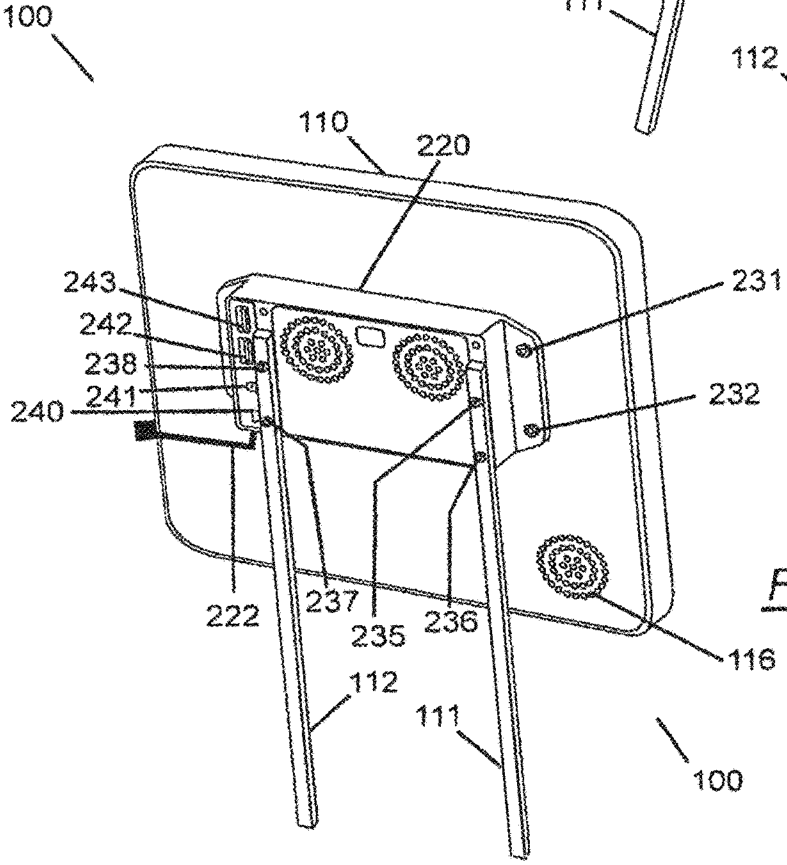
FIG. 2 shows a perspective view of the back of an artificial voice generating system mounted onto an external support.

FIG. 2 depicts the artificial voice generation system 100 from the side opposite the screen 115 of the speech generating system 110. An audio output module 220 is shown attached to the speech generating system 110 via fasteners, as at 231 and 232. Likewise, fasteners 235, 236, 237 and 238 secure the artificial voice generation system 100 to the left support 111 and the right support 112.

Integrated sound systems do not provide a volume or tonal quality sufficient for situations in which an artificial voice needs to be projected over other voices or significant ambient noise levels. To correct this problem, the audio output module 220 is used to produce the artificial voice sound signal in lieu of the speech generating system's 110 integrated sound system, which uses onboard speakers to project sound through the speaker aperture 116. Connecting the audio output module 220 to the speech generating system 110 allows the latter to bypass its integrated sound system, sending the artificial voice sound signals instead to the audio output module 220.

In a preferred embodiment of the present invention, the connection between the speech generating system 110 and the audio output module 220 is accomplished, for instance, via a standard USB connection 222, or through a connection on the reverse side of the audio output module 220 housing (not shown). Many methods of connection will be envisioned by those skilled in the art. The connection used will depend on particular design requirements and the capabilities of the speech generating system used. For example, if the speech generating system had a wireless transmitter that was capable of transmitting R/F, IR, or Bluetooth signals, the audio output module could be connected to the speech generating system wirelessly (see FIGS. 8-28).

Figure 3:
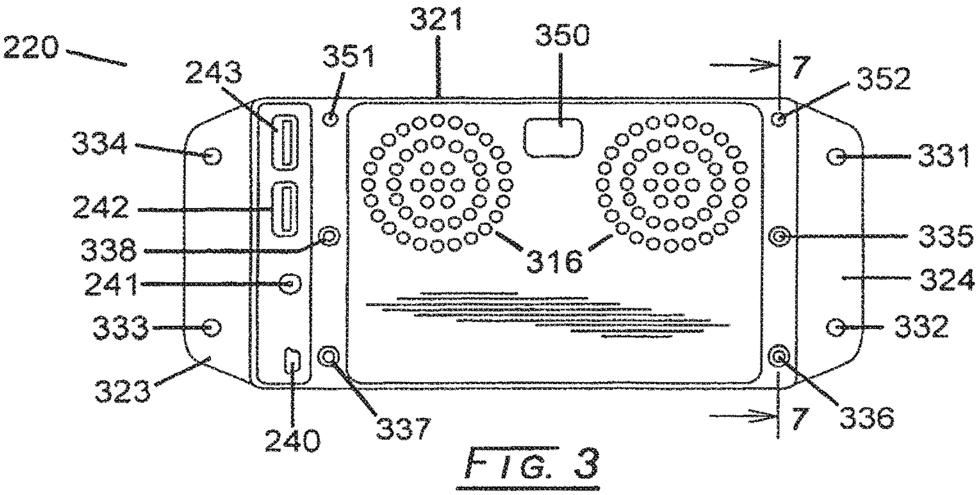
FIG. 3 shows the component housing side of an embodiment of the audio output module.
Figure 6:
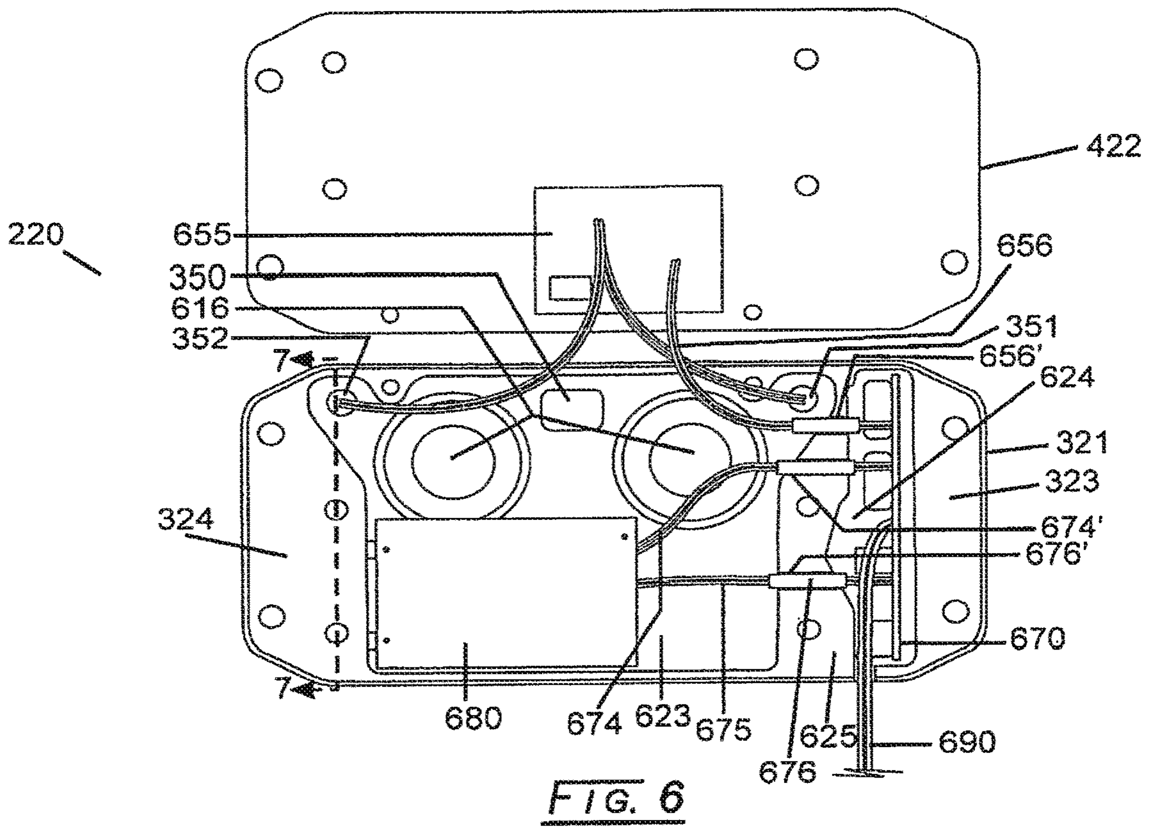
FIG. 6 is a depiction of the internal configuration of an the embodiment shown in FIG. 4, with the cover plate open.

Turning to FIG. 3, the component housing 321 side of the audio output module 220 is depicted. In one particular embodiment of the present invention, the housing 321 is machined from a single unit of material, such as ABS plastic or aluminum. The housing 321 could also be cast from a mold, or using similar manufacturing techniques known in the art suitable for this purpose. Machining the housing 321 helps to ensure that the proper chambers of the assembled audio output device 220 can be effectively sealed from the outside air and each other. FIG. 6 depicts the housing 321 from the opposite side, flipped about the vertical line 7 shown in FIG. 3. Two chambers are created during machining by removing material, creating the sound chamber 623 and the interface chamber 624. The separation of these chambers during the operation of the audio output module 220 is considered essential to the present invention's ability to increase the volume and tonal quality of the sound produced. While FIGS. 1-7 depict a preferred embodiment using a USB connection with the speech generating system for simultaneously transmitting and receiving artificial voice data, as well as powering the module, it will be clear to those skilled in the art that the interface module can be separated from the power module. When using a wireless receiver to communicate with the speech generating system, for example, the module may be supplied with power through lithium ion batteries, housed in a separate chamber. Likewise, the power system could share a chamber with the interface system.

Returning to FIG. 3, several other features of the housing are notable. The housing can include one or more speaker perforations 316, which are a series of apertures in the housing that allow sound to pass from a speaker mounted behind the speaker perforations 316 to the listener. The speakers are depicted in FIG. 6 as 616 and are attached to the inside surface of the housing, facing outward. The speakers are driven by the amplifier and audio signal processing circuit 680, which receives audio signals from the speech generating system 110 via the electrical connection at 674. The additional amplifier component 680 of the audio output module 220 will effect an ability to produce a significantly increased volume of artificial voice received from the speech generating system 110.

The audio signal processing circuit 680 of FIG. 6 also includes an electric double-layer capacitor, or supercapacitor, when used in conjunction with a power source having a maximum limit on its power output magnitude supplied to the system. For example, the audio output module power supply in the embodiment shown in FIG. 6 is a standard USB connection 690. USB connections, such as shown at 690 supply power to USB devices at a specific range dictated by a standardization body. Limiting controls on USB power supplies (supplying the power to 690) are often utilized to terminate the power connection when the USB device draws power at levels higher than the standard maximum. High volume requires an increased power draw. Thus, for audio output devices drawing power from a USB power supply, the volume levels achievable are limited by the maximum power levels available through the USB power supply. Higher volume levels can be achieved through the use of supercapacitors, because audio signal amplification does not require a continuous magnitude power draw, but rather short periods of high magnitude power draw during particular peak output frequencies.

The wire 674 is electrically connected to the interface board 670. The interface board 670 is a circuit board with input and output components as needed for a particular application. In this particularly depicted embodiment, the interface board 670 includes a mini-USB connection 240, a ⅛" analog jack 241, and a first 242 and second 243 USB connection, as depicted in FIG. 3. Many configurations are available, as particular applications are very likely to have differing design requirements. The amplifier circuit 680 also receives its power from the interface board 670, via the power connection 675.

In some cases, the user of the system may have significant physical impairment, such that it is desirable to include in the speech generating system 110 functionality for remotely controlling other household devices. For example, a user may have remotely controllable blinds, lights, televisions, and ceiling fans, to name a few. In order to provide for remote control functionality, the ability to send and receive wireless signals in the audio output module 220 may be desirable. Thus, wireless system components can be included in the audio output module 220 to facilitate system compactness and reduce the number of necessary additional components. FIGS. 3 and 6 depict a small infrared (IR) sensor window 350 that is permeable with respect to IR light, and allows IR signals to pass through to the IR sensor/circuit 655. The IR sensor/circuit 655 can thus receive signals from IR devices in the user's home, and IR light-emitting diode (LED) transmitters 351 and 352 are used for sending command signals to such devices.

Figure 4:
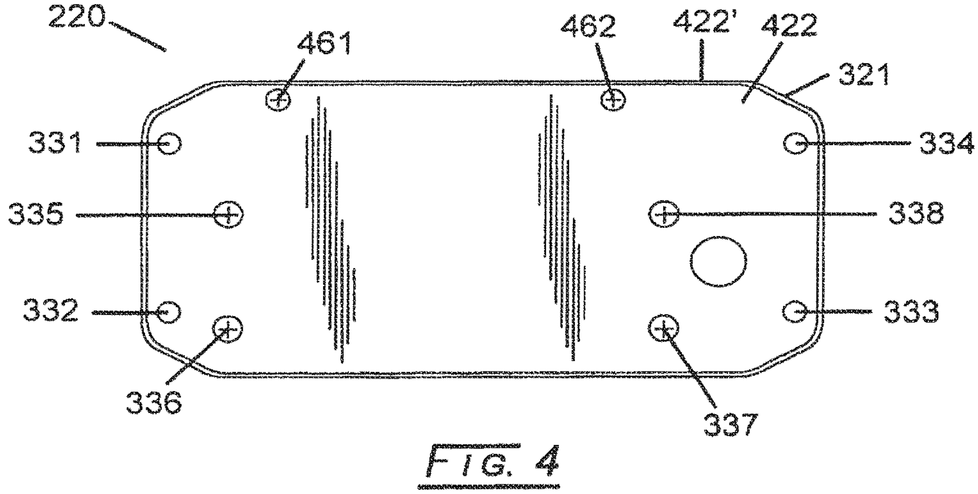
FIG. 4 shows the cover plate side of an embodiment of the audio output module, rotated 180 degrees around the vertical line 7 shown in FIG. 3.
Figure 5:
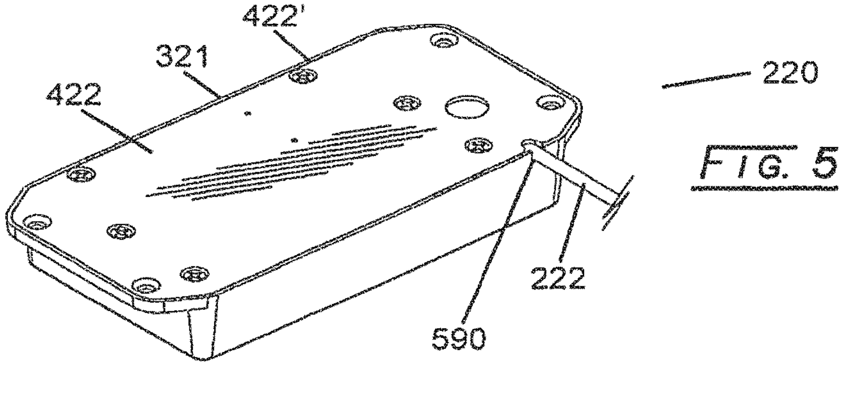
FIG. 5 shows a perspective view of the cover plate side of an embodiment of the audio output module.

FIG. 4 depicts the cover plate side of the audio output device 220, oriented as if FIG. 3 were rotated around the vertical line 7-7. The cover plate 422 provides for the complete enclosure of the audio output device 220 when connected to the housing 321. It is preferred that cover plate 422 is shaped to fit within a sealing lip 422' of the housing, and rest on the surface of the left flange 323, right flange 324, and separating wall 625 (FIG. 6). Separating wall 625 spatially separates the two chambers making up the interior of the housing 321—the sound chamber 623 and the interface chamber 624. The cover plate 422 is attached to the housing with screws via holes 461 and 462 shown in FIG. 4. FIG. 4 also depicts mounting holes 331, 332, 333, and 334, in which mounting screws can be used to mount the audio output device 220 to the speech generating system 110.

In whatever manner users of the present invention ultimately configure the audio output module 220, the housing 321, and the cover plate 422, it is important that the sound chamber 623 is sufficiently sealed off from the air outside the chamber when the audio output module 220 is assembled. This is true regardless of the number of chambers used in the module beyond the sound chamber 623. By increasing the driving voltage to the speakers 616, the amplifier 680 increases the magnitudes of the speaker voice coil travel distance with respect to the front plate. In turn, this also increases the derivative or rate of change of the voltage signal, which results in an increased reactive restoring force required by the structure of the speaker. The increased stress on the speaker structure thus decreases a speaker's ability to reproduce accurate and high quality tones as it is mechanically difficult to cease voice coil movement immediately after the termination of an audio signal from the amplifier 680. That is, increasing the voltage magnitude of the audio signal to produce louder tones will result in a speaker that continues to vibrate after a source sound stops or changes. This directly affects the sound system's quality by coloring the original sound signal.

To counteract the problem with sound quality that is created by increasing the system's 220 output volume, damping forces must be introduced. The problems with current output modules stem from the requirement that they be connected to a speech generating system, such as one depicted in FIGS. 1 and 2 as 110. To meet this requirement, current systems that do not use the speech generating system's integrated sound utilize an interface board, such as the interface board 670 depicted in FIG. 6, in order to electrically connect the device to the speech generating system 110. The nature of the connective components, such as those shown as 240, 241, 242, and 243 in FIGS. 3, and 222 in FIG. 2, are such that sealing the audio housing off from the outside atmosphere is impossible. In addition, the audio output module power supply and USB connection 690 illustrated in FIG. 6 connect to the speech generating system 110, requiring an opening in the housing 590—an example of an opening for such a connection being shown in FIG. 5. Thus, current systems are able to provide higher output speakers, but little damping force, resulting in poor sound quality.

The present invention introduces damping forces into the audio system by segregating the audio components from the interface components and any other desired components. This is accomplished by creating at least two separate chambers as shown in FIG. 6—the sound chamber 623 and the interface chamber 624. The separating wall 625 spatially separates the two chambers from one another when the cover plate 422 is attached. The only pathway between the two chambers is restricted to the wire pass-throughs indicated at 656', 674', and 676'. These wire pass-throughs 656', 674', and 676' are grooves cut flush with the top of the separating wall 625. Wire insulators, such as the one depicted as 676, are placed around the wires utilizing the pass-through. For instance, the pass-through at 676' is sized to be slightly larger than the wire 675 passing through it, and is then fitted with wire insulator 676, which fits snuggly into the pass-through 676', sealing the chambers from one another.

Sealing off the sound chamber 623 allows for a housing design that can be optimized for the speakers' 616 inherent qualities. Those skilled in the art will appreciate that, given the characteristics of a particular speaker chosen as a component for the audio output module 220, one can easily determine a sound chamber 623 volume that will result in optimal tone quality. The sound chamber 623 may thus be designed to maintain a low overall profile to decrease module bulkiness, while simultaneously providing for the appropriate damping force and eliminating resonant frequencies from the system. The decrease in the profile of the system also allows the module to be utilized with computing devices that are ever-decreasing in size—sleek and lightweight devices such as mobile phones, or Apple iPad and other similar devices.

Figure 7:
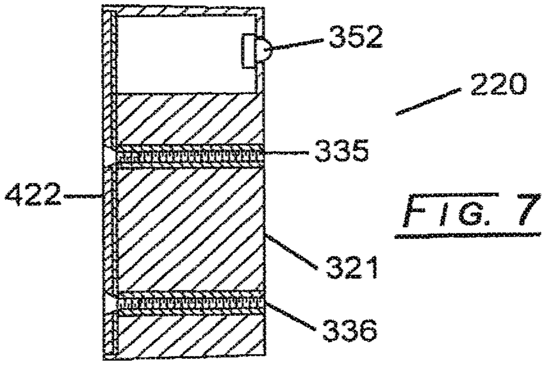
FIG. 7 shows a sectional right side view of FIG. 3 taken at the plane passing through vertical line 7.
Figure 8:
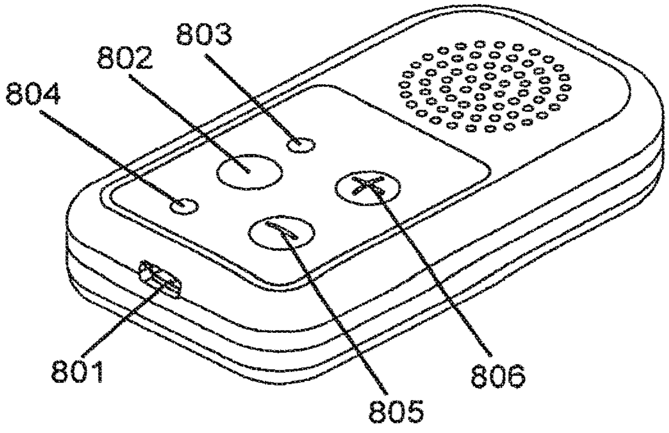
FIG. 8 shows a perspective view of a wireless audio output module that is configured to be worn around a user's neck.

Referring to FIG. 4, the assembled audio output module 220 is depicted from the cover plate side, oriented as if FIG. 3 were to be rotated around the vertical line 7. Four threaded inset holes are shown at 335, 336, 337, and 338. The opposite ends of these threaded insets are shown in FIG. 3 as 335, 336, 337, and 338. FIG. 7 is a sectional right side view of FIG. 3 taken at the plane passing through vertical line 7. The sectional view passes through threaded insets 335 and 336 and IR LED 352. Referring back to FIG. 2, these threaded insets allow the artificial voice generation system 100 to be mounted to left support 111 and right support 112. By threading mounting screws 235, 236, 237, and 238 through threaded insets 335, 336, 337, and 338, respectively, and into the speech generating system 110, the mechanical forces and stresses that result from the forces that are applied to the entire system 100 can be made to bypass the audio output module 220. For example, if the user places a hand at the top of the screen 115 on the speech generating system 110 and presses forcefully, a moment will be applied to the mounting screws 235, 236, 237, and 238. The force will be transferred through the mounting screws to the left support 111 and the right support 112, instead of being absorbed by the audio output module 220.

This is desirable to reduce mechanical stress on the module 220 components and increase its expected life.

Electronic systems such as the audio output module 220 can be susceptible to many types of wireless signals and magnetic fields. To protect the electronic components from failure and to increase the effectiveness of the wireless IR components, the preferred embodiment of the present invention is treated prior to assembly. The inside surface of the cover plate 422 and the inside surfaces of the housing 321 are first coated with a copper flake electromagnetic interference (EMI) shield spray-on coating to protect the electrical components of the audio output module 220 from electromagnetic conduction and radiation. The same surfaces are then coated with a nonconductive conformal clear coating to insulate the electrical components and prevent unwanted electrical connections.

Another embodiment of the present invention includes a separable audio output module, or sound output device. While high volume output is desired on many occasions, artificial voice generation system users also have a need for portability and high quality low volume sound for certain settings. In many situations, the physical location of the sound source may become as or more important than sound. In a preferred embodiment of the present invention, interface board 670 is configured with a Bluetooth (or other similar protocol) transceiver capable of communicating with a speech generating system via standard Bluetooth protocols for wireless data transmission.

The interface board is housed in the interface chamber 624, along with a rechargeable power source. The power source can alternatively be housed in a separate, third power chamber. In the preferred embodiment, all of the components of the audio output system are housed together in a single chamber. It is preferred, however, that the module remain configured with two chambers, as the power source requires a connection external to the module in order to be recharged. Because the interface board does not need a physical external connection when configured for wireless communication, it may be housed in either chamber.

Another benefit of detachability is an increase in the effectiveness of artificial voice generation systems. Detachability allows the user to wear the audio output module in close proximity to their mouths, creating a more natural sounding artificial voice. Locating the sound output in this manner would make the voice appear to emanate from the area from which voices are expected to emanate. A detachable, wearable embodiment of the invention can be attached to a lanyard or decorative chain, or may be worn on a shirt pocket or neck by way of a belt clip. The wearer is able to configure the length of the lanyard or chain so that the audio output module can be worn close to the head and neck area without infringing the wearer's comfort. Configurations of the invention in this manner would thus decrease or eliminate the initial confusion that some people experience when interacting with a user of an artificial voice generation system for the first time.

Figure 16:
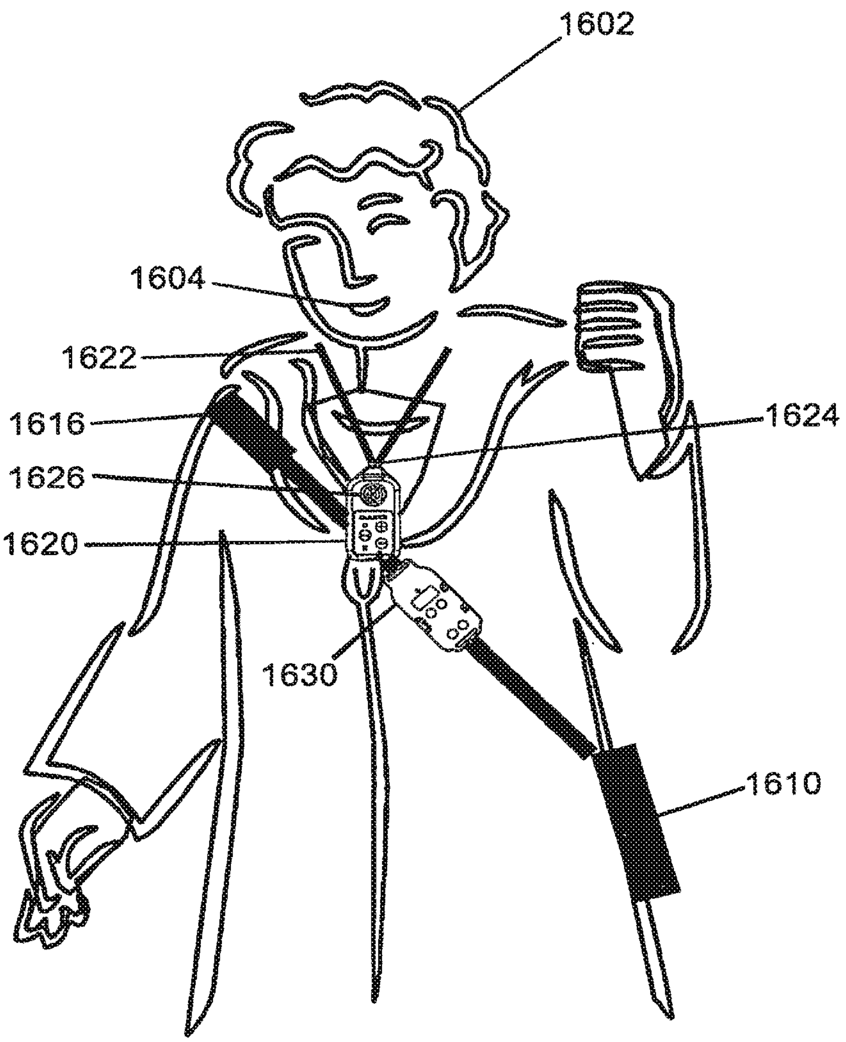
FIG. 16 is a front view of a person wearing an embodiment of a wireless audio output module around the neck at a position in relative proximity to the mouth, with an associated quick release cradle incorporated into a shoulder strap of a speech generating system.

For example, FIG. 16 depicts a voice generating system user 1602 utilizing a speech generating system 1610 that is carried by the user 1602 via a shoulder strap 1616. A quick release cradle 1630 for storing the audio output module 1620 when not worn by the user 1602 is incorporated into the strap using strap receptacles (as further described in connection with FIGS. 18-20. The user 1602 can wear the audio output module 1620 around the user's neck on a strap, chain, or the like 1622, by attaching the module 1620 at a pendant attachment point 1624. The preferred method of attachment at the pendant attachment point 1624 utilizes a quick-release keychain attachment for swift connection and disconnection. Weating the audio output module 1620 in this manner vastly improves the overall effectiveness of a voice generating system, and increases the user's ability to interact with others, because of the decreased spatial distance between the user's mouth 1604 (the expected source of sound) and the module's 1620 sound generation port 1626. The sound generation port 1626 (or speaker perforations) is the port in the module's casing from which the voice sound emanates. Orienting the generated voice source in close proximity permits for more natural and expected sound as perceived by listeners.

Figure 17:
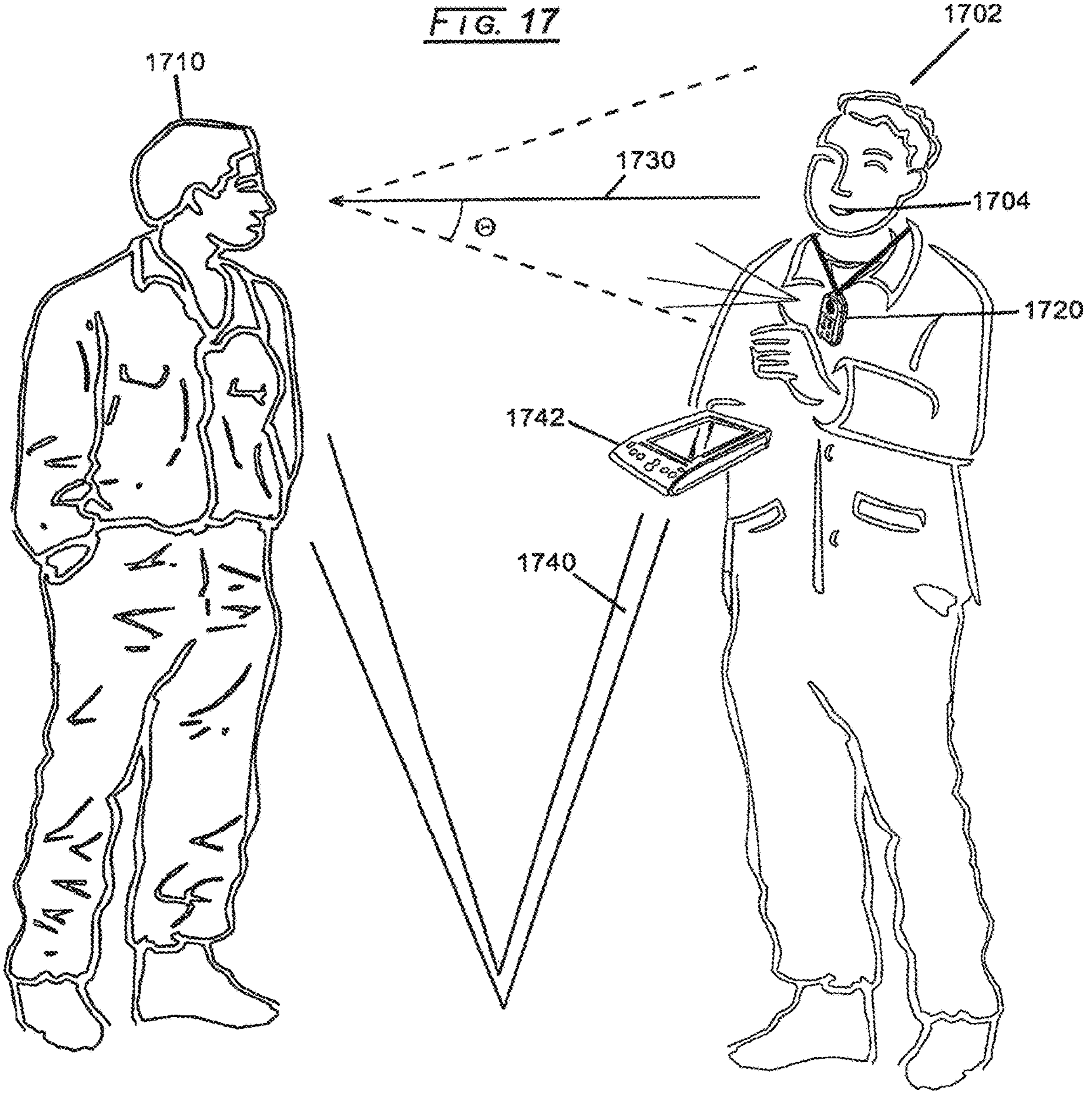
FIG. 17 is a side view of a first person communicating with a second person using an embodiment of a wireless audio output module, and includes a version of the prior art.

Turning to FIG. 17, the increased usefulness and effectiveness of the present disclosure is illustrated for example purposes. The voice generation system user is depicted at 1702, having a mouth 1704. A listener 1710 conversing with the user 1702 expects the direct path of the sound representing the user's 1702 voice to come from the mouth 1704, directed along arrow 1730. It is the experience of the applicants that, the generation of an artificial voice sound within the angle represented by .theta., from the perspective of the listener 1710, will result in the perception that the artificial voice is emanating from a natural source. Use of a module 1720 in this location range causes the effectiveness of the system to increase dramatically by causing increased eye contact between the listener 1710 and user 1702, and allows the user 1702 to use their extremities for directing the speech generating system (not shown) instead of concentrating on locating and directing the sound output location. Prior art versions of voice generating systems often resulted in the direction of sound at angles skewed from arrow 1730, such as the sound being directed generally downward at 1740 from hand-held voice generating system 1742. Such methods are undesirable in that they reduce the effective transmission of sound through reflection off of various surfaces, and cause the sound to appear to be emanating from unnatural sources.

FIGS. 8-12 depict another embodiment of the present invention. In FIGS. 8-12, a chambered audio output module with wireless communication ability is depicted having a battery charging port 801, wireless connection initiation (i.e., pairing) button 802, wireless connection indicator 803, power level or charging indicator 804, and volume buttons 805 and 806. Buttons and indicators 802-806 are examples of controls that may be used for activating and controlling the sound output device, and make up an externally accessible control interface for the audio output module. The device is shown with a lanyard connection point 1008, in FIGS. 10 and 11, where a lanyard, chain, or other connective material may be used to secure the device to a person's body or other similar convenient location. Other configurations for attaching such material may be used as provided for in the art, such as a quick connect/disconnect key chain assembly that will permit attachment and detachment of the device with one hand (see FIGS. 23-25).

Figure 9:
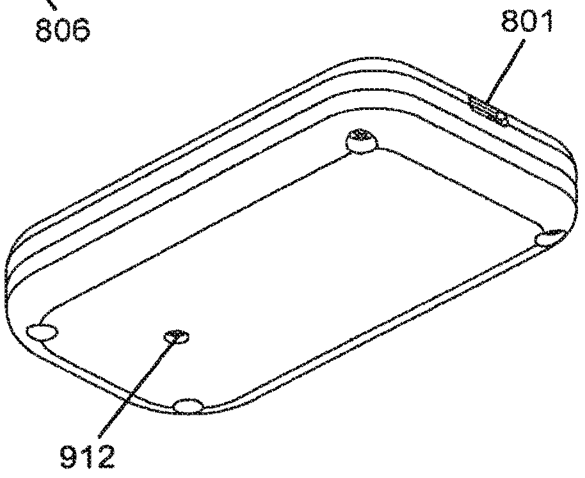
FIG. 9 shows a perspective view of the bottom of the embodiment shown in the FIG. 8.
Figure 10:
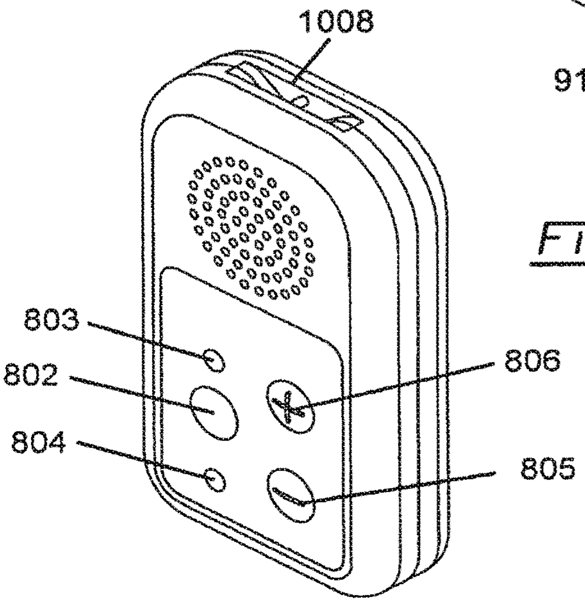
FIG. 10 shows an elevated perspective view of the embodiment depicted in FIG. 8.
Figure 11:
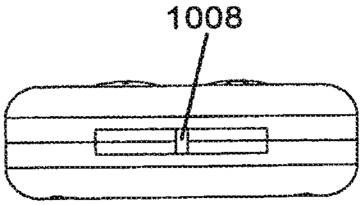
FIG. 11 is a top view of the wireless embodiment depicted in FIG. 8.
Figure 12:
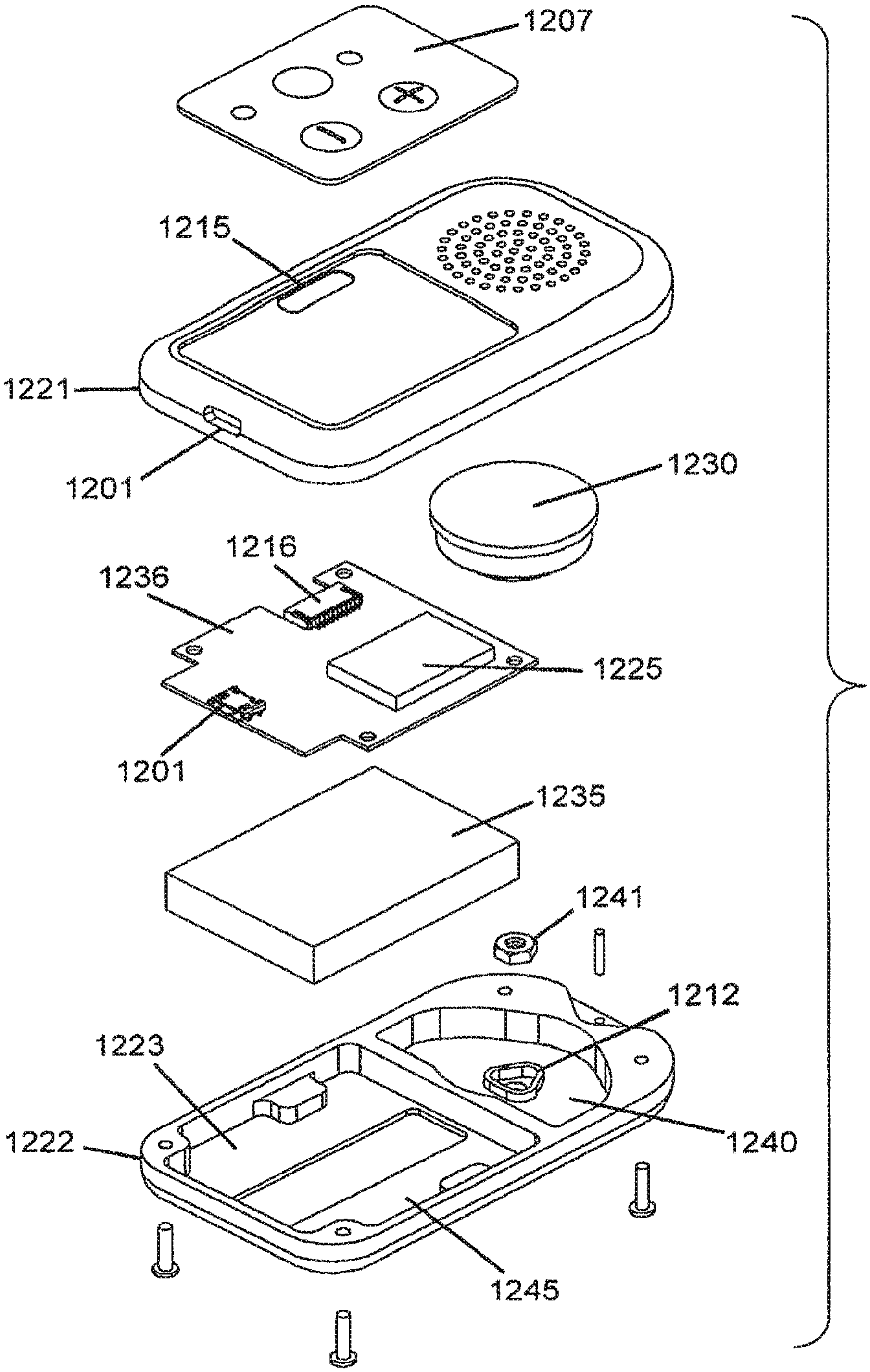
FIG. 12 is an exploded view of the components of the wireless embodiment depicted in FIG. 8.

Turning to FIGS. 9 and 12, hole 912 and profile 1212 are used to more permanently attach the device to a speech generating device, wheelchair, cradle, or other such location for those users for whom a quick connect/disconnect ability is undesirable. The use of a low profile trapped nut 1241 in profile 1212 is used to secure the device from being removed.

In one embodiment utilizing wireless audio data transfer, the audio output module is made of a top half 1221 and a bottom half 1222 that are secured together to create a sealed seam. The interface chamber 1245 houses a rechargeable battery 1235 and a circuit board 1236. A battery charging port 1201 is shown in this embodiment as a mini-USB port, however other types of power-supply ports may be used without departing from the scope of the invention. The battery charging port 1201 is used to connect a power supply to the rechargeable battery 1235 to provide for device operation independent of a wired power source for extended periods of time. Thus, the device can be worn around the neck, or placed generally away from the speech-generating device as necessary and convenient.

An externally accessible control interface, or button assembly 1207 may be constructed in a manner that contributes to the overall effectiveness of the device in that the sealing of the chambers is benefitted. For example, button assembly 1207 may be provided as a single piece sealed membrane overlay, contributing to effectiveness of the device's seal by providing less openings. The ribbon connector (not shown) passes through void 1215 and is used for communicative connection between the button assembly 1207 and the circuit board 1236, connecting as 1216. Using a single assembly, such as at 1207 provides a better seal which simultaneously allowing for a slimmer, thinner profile (i.e., depth) in the device, which is desired as bulky thick devices would be uncomfortable to wear.

The interface board 1235 may also be provided with an integrated wireless module 1225, such as a Bluegiga® integrated Bluetooth module.

Providing wireless connectivity allows the audio output module to be used separately from the speech-generating device, and to be worn, for example. It also eliminates more ports to the outside of the module, which increases the ability to effectively seal the module. The embodiment depicted in FIGS. 8-12 is also comprised of one or more speakers 1230 for generating the audio signals received by the wireless module 1225. The speaker 1230 is housed in a separate audio chamber 1240, which is sealed off from interface chamber 1245 in the same manner as described above in connection to FIG. 6.

It would be useful for wireless audio output modules to have the ability to detach from the speech generating system quickly. This would enable safe storage through attachment to the speech generating system, but would also improve usability by permitting the uses discussed above, and do so without much delay. A magnetic attachment between the audio output module and the speech generating system is therefore the preferred method of attachment. Other quick attachment methods of similar operation may be used without departing from the scope of the invention, magnetic attachment being preferred due to the lack of securing fasteners, straps, and other impediments to use by those with decreased motor skills.

Figure 13:
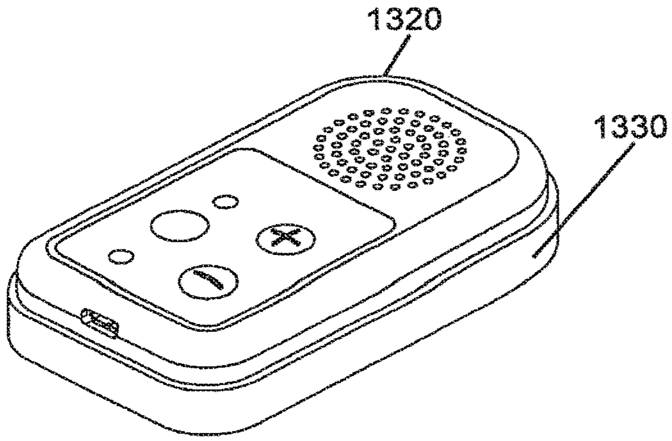
FIG. 13 is a perspective view of the wireless embodiment depicted in FIG. 8 attached to a quick release cradle.
Figure 14:
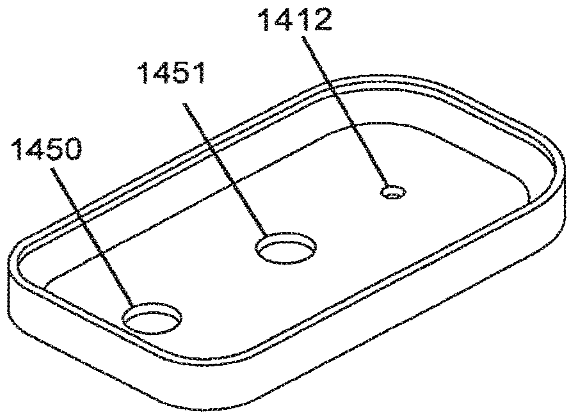
FIG. 14 is a perspective view of an embodiment of a quick release cradle.
Figure 15:
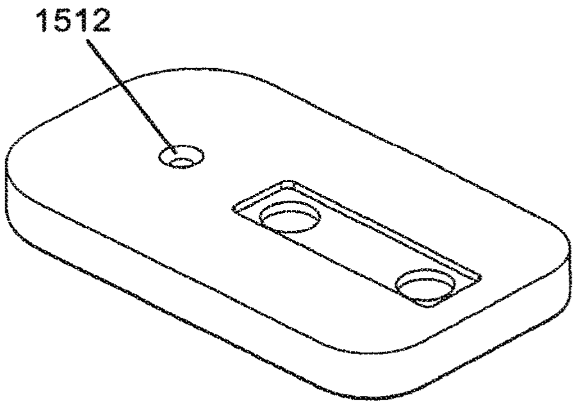
FIG. 15 is a bottom perspective view of the embodiment of a quick release cradle depicted in FIG. 14.

Turning to FIGS. 13-15, a cradle 1330 is shown for receiving the audio output module 1320. Inside of the base of the cradle 1330 are magnets 1450 and 1451, which attract metal strips that are secured to the inside surface of the bottom half 1222 of the audio output module, as at 1245 in FIG. 12, or located in the material comprising the bottom half 1222, or on the outside surface. It is preferred that the attachment method by asymmetrical, so that the audio output module 1320 may be inserted into the cradle in only one orientation. This improves usability and provides additional securing forces during lateral force applications in which it is important for the module 1320 to remain secured to the cradle 1330. Counter sink 1512 leading to hole 1412 provide clearance to the bolt onto which the low profile trapped nut 1241 shown in FIG. 12 is attached, should the user wish for a more permanent and secure attachment of the module to the cradle.

Figure 20:
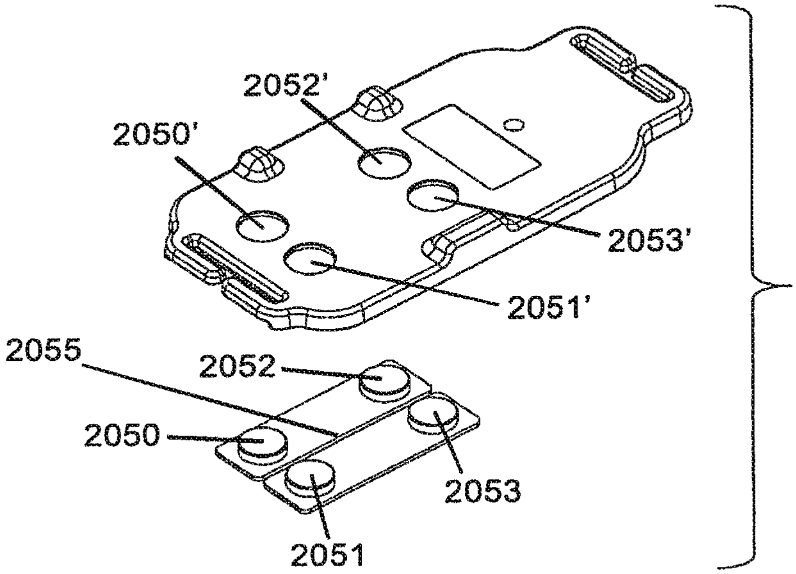
FIG. 20 is an exploded view of the components of the quick release cradle embodiment depicted in FIG. 18.

As shown in FIGS. 18-20, a greater amount of embedded magnets may be used for increased securing forces when the module is attached to the cradle 1830. The magnets 1850-1853 protrude from one or more bases 1955 that are attached to the cradle 1830, as shown in FIG. 19. FIG. 20 depicts an exploded view of the cradle 1830 with the magnet base 1955 detached. In that figure, it can be seen that the magnets 2050-2053 protruding from the magnet base 2055 are positioned within corresponding magnet voids 2050'-2053'. A securing hole 1812, in conjunction with countersink 1912, can optionally be used to provide a more permanent means of securing the audio output module to the cradle, if desired, as previously described in connection with FIGS. 9 and 12.

FIG. 18 also depicts an alternative embodiment of the quick release cradle in which securing protrusions 1825, 1826, and 1827 are designed to mate with matching depressions in the audio output module (FIGS. 21-22, with depression 2225 corresponding to protrusion 1825, 2226 to 1826, and 2227 to 1827) to provide for asymmetric securing forces during docked operation, and to assist users with decreased motor control in guiding the audio output module into the cradle in the correct orientation. Further functionality, such as strap receptacles 1860, 1861 allow for wrist, wheelchair, or other useful location attachment of the cradle, such as on the shoulder strap 1616 of the speech generating system 1610 depicted in FIG. 16. Wearing the cradle 1830 on one's wrist, for example, would allow for the user to direct the sound with his or her hand, while using both hands or the other hand to interact with the speech-generating software. In lieu of the cradle being attached to one of these convenient areas, the cradle may be attached, magnetically or permanently, to the speech generating system itself. For example, FIG. 27 depicts an audio output module 2720 docked with cradle 2730, which is in turn affixed to a hand-held speech-generating device 2710 (e.g., a mobile phone or iPod Touch®).

Figure 25:
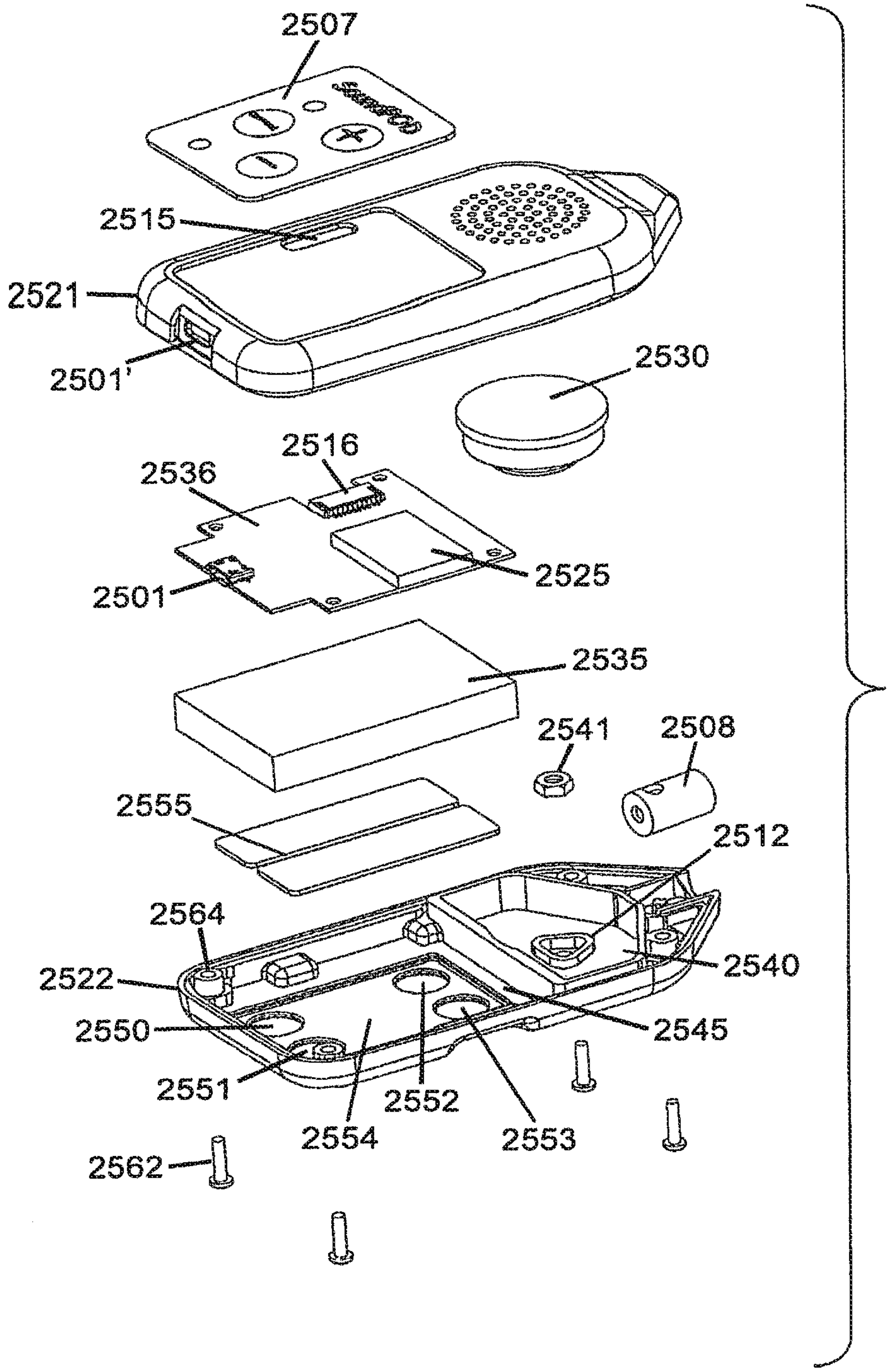
FIG. 25 is an exploded view of the components of the wireless embodiment depicted in FIG. 21.

Turning to FIGS. 21-24, the preferred embodiment of the audio output module 2120 is shown in several views. As in FIGS. 8-11, this embodiment contains a battery charging port 2101, wireless connection initiation (i.e., pairing) button 2102, wireless connection indicator 2103, power level or charging indicator 1204, and volume buttons 1205 and 1206. Buttons and indicators 1202-1206 are examples of controls that may be used for activating and controlling the sound output device, and make up an externally accessible control interface for the audio output module. The device is shown with a quick connect/disconnect key chain assembly that will permit attachment and detachment of the device with one hand 2308 positioned within neck enclosure 2314. FIG. 25 shows the quick release mechanism 2508 that is housed within the top 2521 and bottom 2522 halves of the audio output module housing. The bottom half of the housing contains depressions 2225, 2226, and 2227 in order to facilitate the quick attachment of the audio output module to the cradle, and to provide retaining support for securing the audio output module to the cradle. FIG. 25 depicts voids 2550-2553 in the bottom half of the audio output module (also shown as 2250-2253 in FIG. 22) through which one or more ferromagnetic plates 2555 are exposed, increasing the retention power of the magnetic field created by the magnets in the quick release cradle.

Also in the preferred embodiment utilizing wireless audio data transfer, the audio output module is made of a top half 2521 and a bottom half 2522 that are secured together to create a sealed seam. The halves 2521 and 2522 can be secured together using, for instance, multiple screws such as depicted at 2562 inserted through threaded hole 2564 in the bottom half 2522 and into the top half 2521. The interface chamber 2545 houses a rechargeable battery 2535 and a circuit board 2536. A battery charging port 2501 is shown in this embodiment as a mini-USB port accessible through void 2501', however other types of power-supply ports may be used without departing from the scope of the invention. The battery charging port 2501 is used to connect a power supply to the rechargeable battery 2535 to provide for device operation independent of a wired power source for extended periods of time. Thus, the device can be worn around the neck, or placed generally away from the speech-generating device as necessary and convenient.

An externally accessible control interface, or button assembly 2507 may be constructed in a manner that contributes to the overall effectiveness of the device in that the sealing of the chambers is benefitted. For example, button assembly 2507 may be provided as a single piece sealed membrane overlay, contributing to effectiveness of the device's seal by providing less openings. The ribbon connector (not shown) passes through void 2515 and is used for communicative connection between the button assembly 2507 and the circuit board 2536, connecting as 2516. Using a single assembly, such as at 2507 provides a better seal which simultaneously allowing for a slimmer, thinner profile (i.e., depth) in the device, which is desired as bulky thick devices would be uncomfortable to wear.

The interface board 2535 may also be provided with an integrated wireless module 2525, such as a Bluegiga™ integrated Bluetooth module. Providing wireless connectivity allows the audio output module to be used separately from the speech-generating device, and to be worn, for example. It also eliminates more ports to the outside of the module, which increases the ability to effectively seal the module.

The embodiment depicted in FIGS. 21-25 is also comprised of one or more speakers 2530 for generating the audio signals received by the wireless module 2525. The speaker 2530 is housed in a separate audio chamber 2540, which is sealed off from interface chamber 2545 in the same manner as described above in connection to FIG. 6.

The embodiments of the audio output module and cradle described in connection with FIGS. 18-25 are shown in FIG. 26 with the audio output module 2620 attached to the quick release cradle 2630. The securing protrusion 1825 fits into depression 2225 and—along with the other protrusions and depressions—securably attaches the module to the cradle. The cradle can also be attached directly to a speech generating system 2710, as in FIG. 27. The assemblies depicted in FIGS. 26-27 permit the user to store the audio output module 2720 with the speech generating system 2710, decreases instances in which the output module is lost or forgotten, and also allows the output module to quickly be deployed around a user's neck for wearing.

Detachable audio output devices also allow for selectable multi-directional audio output from a single speech generating device. Several detachable modules may be utilized in conjunction with a unique circuit and software design to direct audio output to discrete locations, and to selectively choose particular recipients of an intended communication from a group of many. For example, a user may wish to communicate personal care needs to an aide during a public event, such as when the user is attending a class. Non-verbal students sitting near the back of the classroom may also have one module on his person for communicating with those around him or her, and have a third audio output module located at the front of the class near the teacher. The ability to direct speech among particular output devices not located on the user's person provides for several improvements over current systems, so that the non-verbal user may provide output to his or her aide without providing output to the entire classroom, they may carry on private conversations without disturbing the teacher, or can answer questions at a normal volume, through the on-person module and the teacher module. Such abilities are highly desirable in many situations.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above compositions and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

The invention claimed is:

1. A sound output device for use with a speech generating system comprising:

a housing having a sound generation port;

a sound output speaker in communication with the sound generation port;

a wireless module permitting the sound output device to wirelessly communicate with the speech generating system;

a lanyard connection point allowing the sound output device to be worn about a body of a user by a lanyard attachable to the lanyard connection point, wherein an artificial voice generated by the sound output device is perceived to emanate from a mouth of the body of the user when the lanyard is attached to the lanyard connection point and placed around a neck of the body of the user;

wherein the artificial voice is generated by the sound output device receiving communication from the speech generating device and delivering sound generating signals to the sound output speaker.

2. The device of claim 1, wherein the lanyard when attached to the lanyard connection point and placed around a neck of the body of the user positions the sound generation port within 30 centimeters below a mouth of the body of the user, and positions the sound generation port within about 30 degrees from a center point of the mouth of the body of the user from a perspective of a listener.

3. The device of claim 1, wherein the housing further comprises a sound chamber having a volume of between two and twenty times an area of a cone of the sound output speaker multiplied by a cone travel distance of the sound output speaker; or the device further comprising a threaded inset for mounting the sound output device to an external structure, wherein the threaded offset passes mechanical stress through the enclosure to the sound output device, wherein interior of both the housing and the cover plate are coated with a first layer conductive copper flake electromagnetic interference and a second layer non-conductive conformal clear coating.

4. The device of claim 1, wherein said sound output device is attachable to the speech generating system.

5. A sound output device for use with a speech generating system, comprising:

a sound output housing further comprising:

a sound chamber and an interface chamber, wherein the interface chamber and the sound chamber share a separating wall;

an audio output module fitting within the interface chamber of the sound output housing in communication with the speech generating system;

a sound output speaker fitting within the sound chamber of the sound output housing in communication with the audio output module and with a sound generation port; and a lanyard connection point allowing the sound output device to be worn about a body of a user by a lanyard attachable to the lanyard connection point;

wherein the sound output housing is mechanically attachable to the speech generating system.

6. The sound output device of claim 5, wherein the lanyard when attached to the lanyard connection point and placed around a neck of the body of the user positions the sound generation port within 30 centimeters below a mouth of the body of the user, and positions the sound generation port within about 30 degrees from a center point of the mouth of the body of the user from a perspective of a listener, wherein the sound output device generates an artificial voice by receiving communication from the speech generating system and delivering sound generating signals to the sound output speaker, while the sound output device is secured about the body of the user through the lanyard connection point and an audio output is perceived to emanate from the mouth of the body of the user.

7. The sound output device of claim 6, wherein the sound chamber has a volume of between two and twenty times an area of a cone multiplied by a cone travel distance.

8. The sound output device of claim 5 further comprising an external link toggle, wherein triggering the external link toggle invokes a software stack that resets and initiates a communications link between the sound output device and an external audio generator.

9. The sound output device of claim 5, wherein the sound output housing has three or more marginal alignment recesses, a ferromagnetic backing plate and magnet recesses backed by the ferromagnetic backing plate; and/or the sound output device further comprising a sound module cradle with three or more alignment lugs, said lugs arranged to uniquely align with the marginal alignment recesses, and two or more magnets that align with the magnet recesses, wherein the sound module cradle can be aligned with the sound module housing by a user of limited manual dexterity using the mating of the alignment lugs and the alignment recesses to align the sound module housing with the sound module cradle so that the attraction between the magnets and the ferromagnetic backing plate removably retains the sound output housing in the sound module cradle.the body of the user.

10. The sound output device of claim 5 further comprising a cover plate secured to the housing such that the cover plate forms an airtight seal and separating the interface chamber and the sound chamber; and/or an interior of the housing and the cover plate being coated with a first layer conductive copper flake electromagnetic interference and a second layer nonconductive conformal clear coating.

11. The sound output device of claim 5 further comprising an external sound output housing surface mateable with a quick release cradle.

12. The device of claim 1, wherein said sound output device is indirectly attachable to the speech generating system.

13. The device of claim 1, wherein said sound output device is directly attachable to the speech generating system.

14. A wearable sound output device for use with a speech generating system comprising:

a sound output speaker;

a wireless module permitting the wearable sound output device to wirelessly communicate with the speech generating system;

a clip permitting the attachment of the sound output device near a head or neck area of a body of a user of the speech generating system, wherein an artificial voice generated by the sound output device is perceived to emanate from a mouth of the body of the user;

wherein the artificial voice is generated by the sound output device receiving communication from the speech generating device and delivering sound generating signals to the sound output speaker.

15. The wearable sound output device of claim 14, wherein when worn by the user, the device is positionable within 30 centimeters below the mouth of the body of the user.

16. The wearable sound output device of claim 15, wherein when worn by the user, the device is positionable within about 30 degrees from a center point of the mouth of the body of the user from a perspective of a listener.

17. The wearable sound output device of claim 14, wherein the device is attachable to the speech generating system.

18. The wearable sound output device of claim 17, wherein the device is directly attachable to the speech generating system.

19. The wearable sound output device of claim 17, wherein the device is indirectly attachable to the speech generating system.

20. The wearable sound output device of claim 14, further comprising a magnet, wherein the magnet permits the device to be magnetically attachable.

* * * * *